United States Patent [19]
Rottig et al.

[11] 3,755,192
[45] Aug. 28, 1973

[54] PRODUCTION OF CATALYST TABLETS

[75] Inventors: Walter Rottig, Oberhausen-Sterkrade-Nord; Hans-Heinrich Saenger, Mulheim/Ruhr-Speldorf, both of Germany

[73] Assignee: Ruhrchemie Aktiengesellschaft, Oberhausen-Holten, Germany

[22] Filed: Jan. 20, 1972

[21] Appl. No.: 219,495

Related U.S. Application Data

[63] Continuation-in-part of Ser. No. 714,781, March 21, 1968, abandoned.

[30] Foreign Application Priority Data

Apr. 1, 1967 Germany........................ R 45649

[52] U.S. Cl............. 252/428, 252/430, 252/477 R, 252/29, 252/473

[51] Int. Cl. ... B01j 11/06, C10m 7/04, C10m 7/14, C10m 7/26

[58] Field of Search.................... 252/428, 430, 477, 252/29, 473

[56] References Cited

UNITED STATES PATENTS 3,051,662  8/1962  Pitzer et al..................... 252/477 X
3,384,580  5/1968  Peace................................... 252/29

OTHER PUBLICATIONS

Little et al., Tablet Making, 2nd Edition (1963), Pages 63 & 64, Published by Maiden Printing, 137-141 Vauxhall Rd., Liverpool 3, England Primary Examiner—Patrick P. Garvin
Attorney—Ralph D. Dinklage and Arnold Sprung et al.

[57] ABSTRACT

Production of catalyst tablets by admixing the catalyst particles, with or without substrate, with graphite and a polyethylene, polyproplene, polyethylene glycol and/or polypropylene glycol; and then tabletizing the mass.

7 Claims, No Drawings

PRODUCTION OF CATALYST TABLETS

This is a continuation in part of application Ser. No. 714,781 filed March 21, 1968, now abandoned.

This invention relates to the forming of catalyst tablets. It more particularly refers to an improved technique for producing tablet form catalysts.

Tablet form catalysts are well known. These materials have been known to be produced in various sizes as required for the particular process in which such will be used. The preparation of catalysts in tablet-form in an appropriate single or two-stage performing press is known in the art (see Ullmann "Encyklopaedie der technischen Chemie," Vol. 9, 1957, page 275). Depending upon the intended use of the catalyst tablets, their size may be 5 X 5 mm, but may also be larger or smaller. Generally, the catalyst mass to be tabletted is fed into the performing press in finely divided form, as for instance as powder. Since the flowability of such powders is not always satisfactory and the catalyst tablets formed thereof do not always possess adequate cohesiveness and rigidity, the catalyst powder is then admixed with additives to improve these conditions. These additives include for instance graphite in its different modifications, or stearic acid or stearates, such as magnesium or aluminium stearate. The amounts and ratios of the additives depend upon the particular catalyst powder and may vary widely. It is known to use a single additive component or mixtures of several components as the need requires.

Catalyst tablets prepared in this manner are normally not pre-activated nor pre-reduced and require convenient treatment after pelletization in order to attain optimal activity. This treatment can be performed within or outside of the vessel in which the catalyst is intended to be used.

Use of so-called "stabilized catalysts" has been increasing for some time. In this regard, it has become desirable to subject the catalyst to a reducing treatment, for instance with hydrogen, as well as to subsequently stabilize such catalyst in suitable shape, as for instance in form of tablets, string-shaped particles or powder. If desired, the thus prereduced catalyst may be used for the production of stabilized catalyst tablets. Another embodiment of the preparation proceeds from preformed catalyst, as for instance from tablets or string-shaped granules. This is especially the case if precipitated catalysts are used. These catalysts may, if desired, be prepared together with a substrate of carrier materials as for instance diatomaceous earth, Aerosil, or other $Al_2O_3$ and/or $SiO_2$ containing compounds. Such catalyst compositions often suffer from greater or lesser shrinkage during reduction and stabilization thereof which shrinkage impairs the mechanical properties thereof. It is even possible that those catalysts can become unservicable, especially for fixed-bed processes, because of such shrinkage. It is therefore often necessary to comminute and sieve such catalysts and to mould the powder thereby obtained into mechanically unobjectionable, "stabilized" tablets.

It has been found, from observation of various representative tests, that the moulding of stabilized pulverulent masses in commercially available preforming presses is fraught with difficulties. The manufacture of catalyst tablets is accomplished through the use of rigidly mounted matrices, or mold cavities into which the catalyst powder is fed with the aid of suitable dosing devices. The powder is compressed in the matrix interstices by movable rams whereby to produce tablets with good mechanical properties. The movable parts of such devices generally have a significantly long operational life, however, the operational life of the matrices themselves is suject to considerable fluctuation and variation.

Thus, depending upon the chemical and physical properties of the catalyst composition being tabletted or pelletized, the wear-life of the tablet mold cavities, or matrices, is subject to wide variation which, in turn, causes wide variation in the number of catalyst pellets or tablets which can be produced within the useful life of a given molding device. In some cases the number of good pellets produced is extremely small.

It is therefore an object of this invention to provide a novel production means for producing catalyst tablets and/or pellets.

It is another object of this invention to provide a novel composition suitable for pelletizing or tabletizing.

It is a further object of this invention to provide a novel composition catalyst pellet or tablet.

Other and additional objects will become apparent from a consideration of this entire specification including the claims hereof.

In accord with and fulfilling these objects, one aspect of this invention resides in a catalyst composition comprising a catalyst, graphite and an ethylene and/or propylene homo or copolymer, or an ethylene and/or propylene glycol homo or copolymeric compound having a molecular weight of about 3,000 to 2,000,000 and a melting point of about 40° to 150°C. According to this invention, the composition is suitably particulate in nature with the polymer portion thereof having a particle size range of about 1 to 1,000 microns.

Preferably about 1 to 4 percent graphite and about 0.3 to 1 percent of the polymeric compound, related to the entire composition weight, are added. Although the total amount of graphite and polymeric compounds may be greater than 5 percent, such is not considered essential or particularly desirable, since no substantial additional effect is thereby obtained.

Graphite is used in its known commercially available form having a caron content of more than 99 percent and a grain-size distribution such that the amount of particles up to 10 microns amounts to about 50 percent.

Advantageously, the molecular weight of the added polyolefins ranges between about 10,000 and 100,000; that of the added polyalkyleneglycols is between about 5,000 and 20,000. The melting point of the polymeric compounds is preferably about 50° to 150°.

The polymeric compounds are preferably used in as finely divided condition as possible in order to assure a homogenous mixture thereof with the other components. It has been observed that particularly advantageous results are obtained when polymeric compounds with a grain-size distribution spectrum containing not more than at most 1 percent particles of more than 1,000 $\mu$ and at most 10 percent particles of more than 500 $\mu$ are used.

The polymers are generally available in the desired size from conventional production; coarser grained materials must be reduced to the desired grain size distribution in conventional grinding- or cominuting devices known in the art.

With the process according to the invention it has been made possible to increase the operational life of the molding means, or matrices, by more than ten-fold.

It is suggested that the particular nature of the catalytic, and possibly the substrate, material employed is not critical to the invention hereof. Substantially any catalyst can be used as desired. It may be well to consider that catalysts and/or substrates which have been pelletized and/or tabletized in the past by art recognized procedures are suited to use in this invention. Exemplary of these known catalysts are nickel, cobalt, iron, other metals of the platinum group as well as copper, silver and chromium.

In the following Examples the tabletting machine which was used was conventional, commercially available equipment. It consisted of a vertically disposed, exchangeable cylinrical body of stainless steel. Several mold cavities were disposed in the stainless steel body, each of which had two stainless steel ram rods operatively associated therein, and means to drive the ram rods toward each other within the mold cavities. The inside diameter of the mold cavities and the outside diameter of the ram rods, less clearance of course, correspond to the outside diameter of the tablets being produced. The tablet height is determined by the cumulative throw of the ram rods and the clearance left there between.

As noted above, conventional tablet making operations in equipment of this type have been found to be less than satisfactory because after some given period of time, tablets obtained from a given mold cavity are no longer satisfactory. This shows up in produced tablets which have unsatisfactory cohesiveness and rigidity, or in tablets in which the catalyst powder is insufficiently compacted. The effectiveness of lubricants added to a catalyst composition for tabletting is evaluated in terms of how many tablets of a given composition and given minimum physical properties can be obtained from a single mold cavity (or stemple). The values expressed hereinafter are average values taken from multiple mold cavities in a single machine.

In the following tests, those carried out at room temperature were at a pressure of 13 kg/cm$^2$.

The following example is illustrative of this invention without being limiting thereof.

EXAMPLE

String-shaped catalyst grains, containing about 37 percent nickel, about 3 percent magnesium oxide and about 24 percent diatomaceous earth, with the remainder being water, carbon dioxide in form of carbonate etc., were prepared by precipitating nickel nitrate, as well as magnesium nitrate (the latter serving as activator) from a solution thereof with a sodium carbonate solution (both solutions having a temperature of about 100°) in the presence of diatomaceous earth. The precipitate was filtered, washed, dried and molded. The string-shaped particles so obtained were reduced at a temperature of about 500° with a hydrogen stream, subsequently stabilized in a known manner, comminuted and separated by sieving so that after sieving no particles of more than 1.5 mm remained.

1.5 percent by weight graphite and 0.5 percent by weight magnesium stearate were added to the product obtained as hereinbefore described and intimately admixed therewith in a mixing device. The admixture was moulded into tablets, having a diameter of 5 mm and also a length of 5 mm in a conventional laboratory preforming press. After a total tablet output of 3.3 kg per mold cavity, the rate of objectionable and/or partly damaged tablets increased rapidly. At a subsequent inspection of the matrices used, marked stress-appearances were observed, which made the further production of unobjectionable tablets difficult if not impossible. Instead of the above noted addition of 0.5 percent by weight magnesium stearate, the same amount of polythyleneglycol, having a molecular weight of about 10,000 was added to an amount of catalyst as set forth above. The output of tablets was increased to more than 50 kg per mold cavity. With a polyethyleneglycol having a molecular weight of about 20,000 a substantially identical improved output was obtained. With a polyethyleneglycol having a molecular weight of 5,000 the output per mold cavity was improved over the magnesium stearate but was slightly reduced as compared with the higher molecular weight of polyethyleneglycol products.

In another example of this invention, 0.5 percent by weight of polyethylene having a molecular weight of about 60,000 obtained by the so-called "Ziegler-synthesis" in the form of a fine powder was added to the catalyst composition hereinbefore mentioned instead of polyethyleneglycol, an output per mold cavity was obtained at the susequent tabletting procedure, which surmounted that obtained with magnesium stearate by more than twenty-fold.

Further tests were performed as follows:

A composition was prepared as set forth on page 7 except that 1.5 weight percent graphite was used as the only lubricant. The result was a production of 2.7 kilograms of tablets per mold cavity.

A composition as set forth immediately above but replacing the graphite with 0.5 weight percent polyethylene of 60,000 molecular weight resulted in a production of 3.7 kg of tablets per mold cavity.

A composition as set forth immediately above, but replacing the graphite with polypropylene of a molecular weight of 50,000, resulted in a production of 3.9 kilograms of tablets per mold cavity.

A composition as set forth immediately above, but replacing the graphite with polyethylene glycol of a molecular weight of 5,000, resulted in a production of 4.5 kilograms of tablets per mold cavity.

TABLE

| Test number | 1 | 2 | 3 | 4 | 5 | 6 | 7 | 8 | 9 | 10 | 11 | 12 |
|---|---|---|---|---|---|---|---|---|---|---|---|---|
| Graphite | 1.5 | 1.5 | 1.5 | 1.5 | 1.5 | | | | | 2.0 | | |
| Mg-stearate | | 0.5 | | | | | | | | | | |
| Polyethylene | | | | | | 0.5 | 0.5 | | | | 2.0 | |
| Polypropylene | | | | | | | 0.5 | | 0.5 | | | 2.0 |
| Polyethyleneglycol | | | 0.5 | | | | | 0.5 | | 2.0 | | |
| Output | 2.7 | 3.3 | >50 | >50 | >66 | 3.7 | 3.9 | 4.5 | 3.0 | 12 | 18 | 16 |

A composition as set forth immediately above, but utilizing 0.5 weight percent polypropylene of a molecular weight of 50,000 in addition to the graphite, resulted in a production of >50 kilograms of tablets per mold cavity.

Additional tabletting compositions were prepared and tested with different proportions of lubricant therein. The following table sets forth the various lubricants, proportions and outputs which have been found. Proportions reported are in weight percent and output is in kilograms per mold cavity.

What is claimed is:

1. A composition comprising a pelletizable catalyst, about 0.5 to 4 weight percent graphite and about 0.1 to 1 weight percent of a homopolymer of ethylene, propylene, ethylene glycol, propylene glycol, a copolymer of ethylene and propylene or a copolymer of ethylene glycol and propylene glycol having a molecular eight of about 3,000 to 2,000,000 and a melting point of about 40° to 150°C.

2. Composition claimed in claim 1 wherein said graphite proportion is about 1 to 4 weight percent and said polymer proportion is about 0.3 to 1 weight percent.

3. Composition claimed in claim 1 wherein said polymer has a melting point of about 50° to 150°C; said glycol polymer has a molecular weight of about 5,000 to 20,000; and said other polymer has a molecular weight of about 10,000 to 100,000.

4. Composition claimed in claim 1 in tablet form.

5. Composition claimed in claim 1 in finely divided admixture form wherin said polymer particle size is about 1 to 1,000 microns.

6. Composition claimed in claim 5, wherein up to about 1 percent of said polymer particles are larger than 1,000 microns and up to about 10 percent of said polymer particles are larger than 500 microns.

7. A composition claimed in claim 1, wherein the catalyst portion of said composition has been reduced prior to tableting.

* * * * *

UNITED STATES PATENT OFFICE
CERTIFICATE OF CORRECTION

Patent No. 3,755,192     Dated August 28, 1973

Inventor(s) Walter Rotting and Dr. Hans Heinrich Saenger

It is certified that error appears in the above-identified patent and that said Letters Patent are hereby corrected as shown below:

Column 4, line 20

"polythyleneglycol" should be -- polyethyleneglycol --.

Columns 3 and 4 - the Table

The table should be inserted at columns 5 and 6 before the claims.

Signed and sealed this 1st day of October 1974.

(SEAL)
Attest:

McCOY M. GIBSON, JR.
Attesting Officer

C. MARSHALL DANN
Commissioner of Patents